March 31, 1964 A. J. GIGER 3,127,564

BROADBAND GATE COMPRISING TWO BALANCED BRIDGES CANCELING BIAS VOLTAGES AT OUTPUT AND ATTENUATING WHEN OFF

Filed April 14, 1961 2 Sheets-Sheet 1

INVENTOR
A. J. GIGER
BY [signature]
ATTORNEY

March 31, 1964 A. J. GIGER 3,127,564
BROADBAND GATE COMPRISING TWO BALANCED BRIDGES CANCELING
BIAS VOLTAGES AT OUTPUT AND ATTENUATING WHEN OFF
Filed April 14, 1961 2 Sheets-Sheet 2

INVENTOR
A. J. GIGER
BY [signature]
ATTORNEY 3,127,564

BROADBAND GATE COMPRISING TWO BALANCED BRIDGES CANCELING BIAS VOLTAGES AT OUTPUT AND ATTENUATING WHEN OFF

Adolf J. Giger, Springfield, N.J., assignor to Bell Telephone Laboratories, Incorporated, New York, N.Y., a corporation of New York Filed Apr. 14, 1961, Ser. No. 113,974
14 Claims. (Cl. 328—96)

The present invention relates to an electronic gate and in particular to a gate capable of passing signals in a range of frequencies extending from essentially direct current to very high frequencies.

Communication transmission systems must be capable of transmitting low frequency signals, such as those found as components of television signals, to high frequency signals such as those used for carrying multiplexed telephone channels. Many systems carrying telephone or television information are systems having a multitude of channels one or more of which may be used as an alternate or protection channel for the others. If one of the regular channels fails, the signals may be switched to the protection channel.

Various switches have been proposed for such applications and so-called electronic switches which have no moving parts have been employed. Semiconductor gates appear to have attractive possibilities for this use but impedance matching considerations have occasioned some difficulties.

In addition, and of particular interest where frequencies so low as to approximate direct-current signals are to be transmitted, the gating or direct-current control signal required for such gates tends to appear along with the signal which it is desired to transmit over the channel with which the gate is associated. If the desired signal is a television picture signal, for example, the control signal may cause serious distortion of the transmitted information.

Although a blocking means such as capacitors may be connected to the input and output terminals of the gates to prevent the control voltage from passing to the transmission lines, this solution presents many problems. A television picture signal includes low frequency components, sometimes as low as two or three cycles per second. Therefore an undesirably large electrolytic capacitor would be required. Furthermore, at low frequencies, the capacitor in conjunction with the rest of the circuitry will cause the signal to tilt (an occurrence well known in the art) thus distorting the signal. This disadvantage can be compensated for in a known manner but the compensation will result in increased signal loss. Furthermore, transient effects will be transmitted, through the capacitors, to the transmission lines.

An object of the present invention is to improve gate circuits to make them capable of passing signals from direct current to high frequencies without interference to the signal by the gate control signals.

Accordingly, the gate of the present invention comprises a number of asymmetrical conducting devices. The gate is capable of being switched between two states, an On state and an Off state, by a symmetrical direct-current control voltage. In the On state the gate represents a low loss, balanced T pad with respect to a symmetrical signal introduced at the input terminals of the gate. The impedance of the gate is equal to the characteristic impedance of the transmission lines connected to its input and output terminals. In the Off state the gate represents a high loss network and will therefore attenuate any signals introduced at the input terminals of the gate.

In either the On or the Off state the gate represents two balanced bridges to the symmetrical direct-current control voltage. Therefore the control voltage will not appear at the output terminals of the gate even if an unbalance occurs in the control potentials.

In another embodiment only half the above-described gate is utilized for use in conjunction with a single-ended signal.

These and other features of the present invention will become more apparent from the following description taken in conjunction with the drawings in which.

The present invention may be used in the aforementioned types of transmission systems for transmission of information such as television signals, telephone conversations and the like wherein one of a plurality of output channels is to be connected to an input source of signal energy. Such a transmission system is described in the copending application by F. S. Farkas, Serial No. 344, filed January 4, 1960 and assigned to the assignees of the present invention.

This application discloses a transmission system utilizing six regular channels and two protection channels. Provision is made to tap each regular channel and normally to terminate this tap in the characteristic impedance of the transmission line. If one of the regular channels should fail a switch will be made connecting the aforementioned tap to a protection channel. It is to be noted that this transmitter switch in the aforementioned application is shown only schematically. Gates according to the present invention represent one desirable implementation of the necessary switching apparatus.

Figure 1:
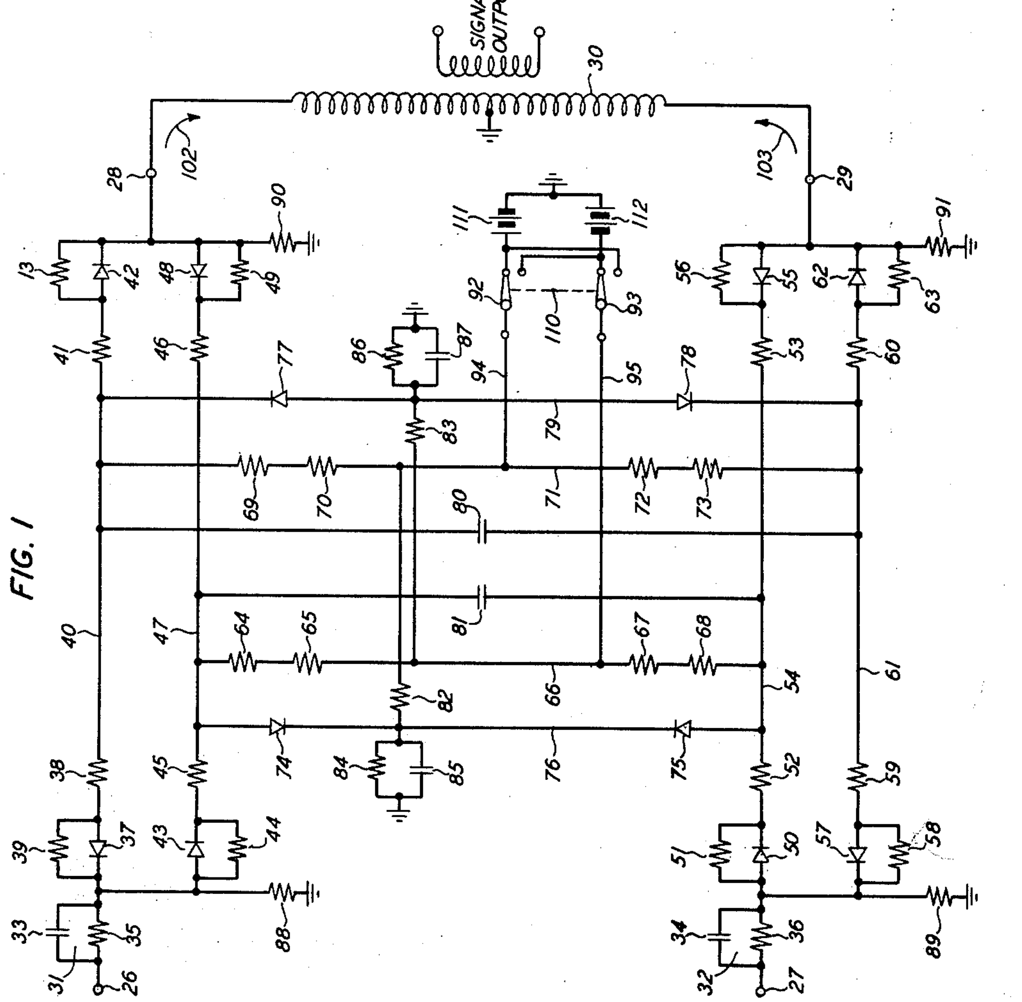
FIG. 1 is a schematic circuit diagram of one embodiment of the gate of the present invention as arranged for use with balanced signals.

A gate according to the present invention may comprise twelve asymmetrical conducting devices arranged as shown in FIG. 1 of the drawings. The direction of the arrow in the symbol for the asymmetrical devices indicates the low resistance direction of current flow through the device. The present embodiment contemplates the use of semiconductor diodes as the asymmetrical conducting elements, however, any element having the same characteristic may be used.

The input terminals 26 and 27 are connected to a source of energy which provides a symmetrical signal such as a transmission line in the radio relay system above mentioned. The output is taken at the output terminals 28 and 29 and may be connected, for example, to a transformer 30 having a grounded center tap. Compensating networks 31 and 32 are connected to the input terminals 26 and 27, respectively, and each comprises a capacitor 33 and 34, respectively, in parallel with resistors 35 and 36, respectively.

The remainder of the gate is composed of identical upper and lower arms each of which provides two paths between the input and the output terminals. The upper path of the upper arm comprises diode 37 in series with resistor 38 and in parallel with resistor 39. This combination is connected by lead 40 to the resistor 41 in series with the diode 42 which is in parallel with resistor 13 and connected to the output terminal 28. The lower path of the upper arm comprises diode 43 connected in parallel with resistor 44 and in series with resistor 45. Resistor 45 is connected in series with resistor 46 by lead 47. Resistor 46 is in series with the parallel combination of diode 48 and resistor 49, the output of this combination is likewise connected to output terminal 28.

The lower path of the lower arm is connected to compensating network 32 at one end and comprises the parallel combination of diode 50 and resistor 51 in series with resistor 52. Resistor 52 is also connected in series with resistor 53 by lead 54 and resistor 53 is in series with the parallel combination of diode 55 and resistor 56, the output of which is connected to terminal 29. The upper path of the lower arm is likewise connected to the compensating network 32 and comprises the parallel combination of diode 57 and resistor 58 in series with resistor 59 which is connected in series with resistor 60 by lead 61. The resistor 60 is also connected to the parallel circuit of diode 62 and resistor 63 which is connected to output terminal 29.

Lead 47 is connected to resistor 64 which is in series with resistor 65. These resistors are connected by lead 66 to the series combination of resistors 67 and 68 to lead 54 thereby providing a resistive path between the lower paths. Lead 40 is connected to the series combination of resistors 69 and 70 which are connected by lead 71 to the series combination of resistors 72 and 73 to lead 61 thereby providing a resistive path between the upper paths.

Shunt diodes 74 and 75 connected to leads 47 and 54, respectively, are connected together by lead 76. Likewise, shunt diodes 77 and 78, connected to leads 40 and 61, respectively, are connected together by lead 79. Capacitor 80 is connected in parallel with the series circuit of diodes 77 and 78 and likewise connected to leads 40 and 61. Capacitor 81 is in parallel with diodes 74 and 75 and is therefore connected to leads 47 and 54.

Resistor 82 is connected between leads 71 and 76; resistor 83 is connected between leads 66 and 79. The parallel combination of resistor 84 and capacitor 85 is connected between lead 76 and ground. Similarly, the parallel combination of resistor 86 and capacitor 87 is connected between lead 79 and ground.

Resistors 88 and 89 are connected between compensating networks 31 and 32, respectively, to ground. Resistors 90 and 91 are connected to output terminals 28 and 29, respectively, and ground.

The direct-current control voltage is brought in at terminals 92 and 93 and connected to leads 71 and 66, respectively, by leads 94 and 95, respectively. In the present embodiment a symmetrical direct-current control voltage is used to bias the diodes and, by way of example, may have potentials of plus and minus 10 volts with respect to ground. Depending upon the polarity of the voltage applied through leads 94 and 95 to the gate, the gate will be in either its On or Off state.

The voltage may be applied to terminals 92 and 93 by any means, but in the present embodiment a double-pole, double-throw switch 110 is shown. Thus, for one position of switch 110, terminal 92 will be connected to the positive side of battery 111 and terminal 93 will be connected to the negative side of battery 112. For the other position of the switch, terminal 92 will be connected to the negative polarity battery 112 and terminal 93 will be connected to the positive polarity battery 111.

For reasons which will become apparent in the discussion which follows, resistors 38, 41, 45, 46, 52, 53, 59 and 60 are equal and have a low value of resistance and may, for example, be 18 ohms; resistors 39, 13, 44, 49, 51, 56, 58 and 63 are equal and have a fairly high value of resistance which may be 7500 ohms for example; resistors 88, 89, 90 and 91 are equal and have a very high value of resistance which, by way of example, may be 19,000 ohms.

*On State*

Figure 2A:
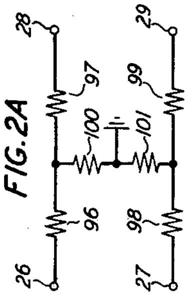
FIGS. 2A and 2B are the alternating-current and direct-current equivalent circuits, respectively, of the gate of FIG. 1 in the On state.

In the On state diodes 37, 42, 43, 48, 50, 55, 57 and 62 are conducting and will have negligible resistance whereas diodes 74, 75, 77 and 78 will be in the non-conducting or high resistance state. The equivalent alternating-current circuit of the gate in the On state is shown in FIG. 2A and comprises a symmetrically balanced T-pad network. The series arms of the network comprise resistors 96, 97, 98 and 99; the shunt arm comprises resistors 100 and 101.

Since diode 37 of FIG. 1 is in its conducting or low resistance state, the parallel resistor 39 may be ignored since this is a high resistance compared with the low resistance of a forward biased diode; this analysis will apply for all the parallel diode and resistor combinations therefore, with respect to the signal, the upper path of the upper arm will comprise diode 37, resistor 38, resistor 41 and diode 42; the lower path of the upper arm will comprise diode 43, resistor 45, resistor 46 and diode 48. Since resistors 38, 41, 45 and 46 and diodes 37, 42, 43 and 48 are identical in impedance value any signal appearing on lead 40 will likewise appear on lead 47. Therefore leads 40 and 47 will be at the same potential and may be theoretically tied together. Thus the resistor 96 shown in FIG. 2A represents the resulting parallel combination of 38, 37 and 43, 45. Likewise resistor 97 of FIG. 2A represents the resulting parallel combination of 41, 42 and 46, 48. Since leads 54 and 61 are at the same potential for the aforementioned reason, they may also be theoretically tied together. Thus the parallel combination of 50, 52 and 57, 59 is represented by resistor 98 (FIG. 2A) and the parallel combination 53, 55 and 60, 62 is represented by resistor 99.

The resistors 64, 65, 69, 70 and 67, 68, 72 and 73 are identical in value. Since leads 40 and 47 may be theoretically tied together because they are at the same potential, leads 66 and 71 may also be tied together for the same reason. That is, since a symmetrical signal is introduced at the input terminals, and both halves of the gate structure are identical, as mentioned before, leads 66 and 71 will appear as a virtual ground and may be connected together. Thus resistor 100 (FIG. 2A) represents the parallel combination of resistors 64, 65 and resistors 69, 70. Likewise resistor 101 (FIG. 2A) represents resistors 67, 68 in parallel with resistors 72, 73. The value of the resistors 64, 65, 67, 68, 69, 70, 72 and 73 will determine the shunt impedance of the gate and therefore, since the characteristic impedance of a T pad is dependent on its shunt impedance, will determine the characteristic impedance of the gate. Thus, by choosing the correct values for these shunt resistors, the characteristic impedance of the gate can be made equal to the characteristic impedance of the transmission lines, thereby eliminating discontinuities in the circuit and their attendant disadvantages.

Usually the characteristic impedance of the transmission lines is low, i.e., about 100 ohms. Thus the impedance of the gate will be low. As shown in FIG. 1, the gate represented schematically in FIG. 2A will be in parallel with resistors 88, 89 and in parallel with resistors 90, 91. However, as noted above, resistors 88, 89, 90 and 91 have a high impedance and may thus be neglected in comparison with the low parallel impedance of the On gate.

The resistors 38, 41, 45 and 46, shown in FIG. 1, and the corresponding resistors in the lower arms 52, 53, 59 and 60 are in series with the diodes to make the current drawn by the diodes constant and equal. Since actual leads interconnect all the elements in the gate, some amount of inductance will be inherent in the circuit. Capacitors 80 and 81 perform the function of shunting this series inductance to thereby form a low-pass filter, and may have values such that the cut-off frequency of the filter is well above that of the highest frequency to be passed through the gate. This will keep the attenuation flat throughout the frequency spectrum of the signals to be passed through the gate when it is in the On state.

The direct-current circuitry of the gate is shown in

Figure 2B:
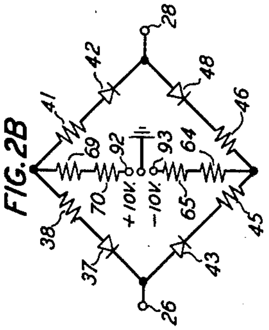

FIG. 2B. In the On state terminal 92 is connected to the positive terminal of a battery 111 and terminal 93 is connected to the negative terminal of battery 112. As heretofore noted, for purposes of explanation, the values of the control voltages are plus 10 volts and minus 10 volts, respectively. Since the upper and lower halves of the gate are symmetrical, it will be obvious that the circuitry described for the upper part will apply for the lower portion of the circuit.

In tracing the direct-current path or control voltage path the current will flow through lead 94 (FIG. 1) to lead 71 and thence through resistors 70 and 69, to lead 40. The current will thereupon separate going to the right and left portions of the circuit through resistor 41 and diode 42; through resistor 38 and diode 37, biasing both diodes into conduction. The negative potential applied through lead 95 and lead 66 and through resistors 64 and 65 to lead 47 will cause positive currents to flow through the combinations of diode 43 and resistor 45 and through diode 48 and resistor 46. It is to be noted the negative potential on lead 47 will bias diode 74 into its high impedance or nonconducting state. Likewise the positive potential on lead 40 will bias diode 77 into its nonconducting state.

As shown in FIG. 2B, a balanced bridge will be presented to the direct-current control voltage, with each of the arms comprising a diode and its series resistance. The current in each arm will be determined by the series resistor, and since the resistors are equal and higher in value than the forward resistance of the diodes, the currents flowing through each arm will be equal. Since a symmetrical voltage is connected to terminals 92 and 93, there will be no direct-current potential appearing at terminal 26 or 28 since a virtual ground will exist at these points with respect to the control voltage.

If any unbalance should occur in the control voltages as, for example, the voltage applied to terminal 92 going to plus 11 volts and the voltage applied to terminal 93 going to minus 9 volts, it is obvious that an unbalanced current will flow from terminal 28 as shown by the arrow 102 in FIG. 1. However, this same unbalanced current must also flow out of terminal 29 in the direction shown by arrow 103 (FIG. 1) since this portion of the circuit is identical to the upper portion described. It is seen that both the currents represented by arrows 102 and 103 will therefore oppose each other and cancel. Thus any unbalance of the switching voltage would not directly interfere with the signal carried on the balanced cable.

Since lead 71 is at a positive potential a current will be drawn through resistors 82 and 84 of FIG. 1 to ground, and in the present embodiment will produce a voltage of approximately plus 3 volts across capacitor 85. Likewise the negative potential of minus 10 volts on lead 66 will cause a positive current to flow through resistors 86 and 83 thereby charging capacitor 87 to a potential of approximately minus 3 volts. The reason of these two biasing voltages will become apparent from the discussion of the gate in its Off state as noted below.

It is known in practice that a diode at high frequencies may be represented by a series resistor connected to a parallel combinattion of inductance and resistance. Since a reactive element is in the circuit, the locus of the impedance of the diode will vary at different frequencies. To compensate for this effect and to make the gate, while in the On state, appear purely resistive at all frequencies, compensating networks 31 and 32 have been added. Thus, these compensating networks have a locus of impedance which is the direct opposite to that of the diodes therefore canceling out the reactance contributed by the diodes.

*Off State*

Figure 3A:
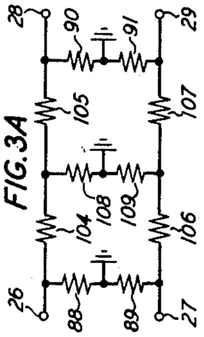
FIGS. 3A and 3B are the alternating-current and direct-current equivalent circuits, respectively, of the gate of the present invention in the Off state.

The alternating-current equivalent circuit of the gate in the Off state is shown in FIG. 3A. In the Off state diodes 74, 75, 77 and 78 will be conducting and in their low impedance state whereas diodes 37, 42, 43, 48, 50, 55, 57 and 62 (FIG. 1) will be biased into their nonconducting or high impedance state. The impedance of the back biased diodes is of a sufficiently high value so they may be disregarded with respect to the comparable lower resistance of the resistors in parallel with these nonconducting diodes.

As noted hereinbefore, leads 40, 47 and leads 54, 61 may be theoretically tied together since they are at the same potentials. Hence one branch of the series arms of the equivalent alternating-current circuit will be the resistance of resistor 39 in parallel with the resistor 44. (The series resistors 38, 45, 41, 46, 52, 53, 59 and 60 may be neglected in determining these series impedances since their resistance is very low compared with the resistance of the resistors shunting the diodes in the upper and lower paths.) This is represented by resistor 104 in FIG. 3A. Resistor 105 of FIG. 3A will represent the parallel combination of resistors 13 and 49 (FIG. 1). Likewise, resistors 106 and 107 represent the parallel combination of resistors 51 and 58, 56 and 63, respectively.

Since the impedance of the upper and lower arms will be fairly high in comparison to the impedance of the upper and lower arms in the On state, resistors 88, 89 and 90, 91 can no longer be neglected. Thus resistors 88, 89 will comprise a first shunt arm as shown in FIG. 3A and the circuit will be from input terminal 26, neglecting compensating network 31, through parallel resistor 88 to ground and through ground to parallel resistor 89 and back to input terminal 27, neglecting compensating network 32; in series with the terminals 26 and 27 will be the aforementioned series resistances. Diodes 74, 75, 77 and 78 are conducting and are in their low impedance condition, thus the shunt resistor 108 (FIG. 3A) is actually the parallel combination of diode 74 and diode 77 as both diodes are connected to ground at one end through the by-pass capacitors 85 and 87, respectively, and since leads 40 and 47, at the other termination of the diodes, are at the same potential and may be thought of as being tied together. Likewise, resistor 109 (FIG. 3A) will represent the parallel combination of diodes 75 and 78. The third shunt arm will represent the impedance of resistors 90 and 91 which likewise can no longer be neglected because of the relatively high impedance of the series arms. In this state the gate provides a high attenuation to the signal and an effective isolation between the input and output terminals.

Figure 3B:
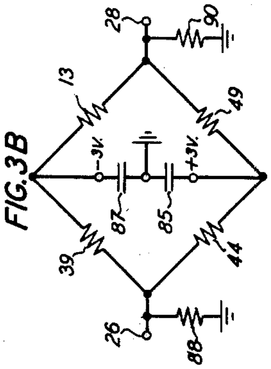

The direct-current circuitry for the Off gate is shown in FIG. 3B. In the Off state terminal 93 is connected to the plus 10 volts and terminal 92 is connected to the minus 10 volts. The positive voltage on leads 47 and 54 (FIG. 1) will bias diodes 74 and 75, respectively, into conduction. Furthermore, diodes 43 and 48, 50 and 55 will be reverse biased. Likewise, the negative potential appearing on leads 40 and 61 will back bias diodes 37, 42, 57 and 62 but will place diodes 77 and 78 into conduction.

The biasing voltages for the Off state will be determined by the two biasing networks comprising resistors 82 and 84, and resistors 83 and 86, respectively, in conjunction with resistors 64, 65, 67, 68 and 69, 70, 72, 73. The reason for this is that the series arm diodes will not be conducting whereas the shunt diodes will conduct and therefore the voltage appearing on lead 47, for example, will be determined by the voltage drops across diode 74 and the parallel circuit of 84 and 85 to ground. The values of the elements in this embodiment are chosen so that this voltage on lead 47 will be 3 volts, however the invention is not to be thought of as limited to this choice.

The equivalent direct-current path (FIG. 3B) will now be from the plus 3 volts on lead 47, over two paths, one going through resistor 44 the other through resistor 49. Likewise the minus 3 volts on lead 40 will cause negative currents to flow through resistors 39 and 43 towards terminals 26 and 28, respectively. Thus, as in the case for the On state a virtual ground will appear at terminals 26 and 28. The voltage divider circuits described above and capacitors 85 and 87 maintain the potentials on leads 76 and 79, FIG. 1, constant at the plus 3 volts and minus 3 volts respectively in the On, Off and transition states of the gate. If any unbalance occurs in these voltages it will again be canceled on the transmission lines and not interfere with the signal for the reason hereinbefore noted.

Figure 4:
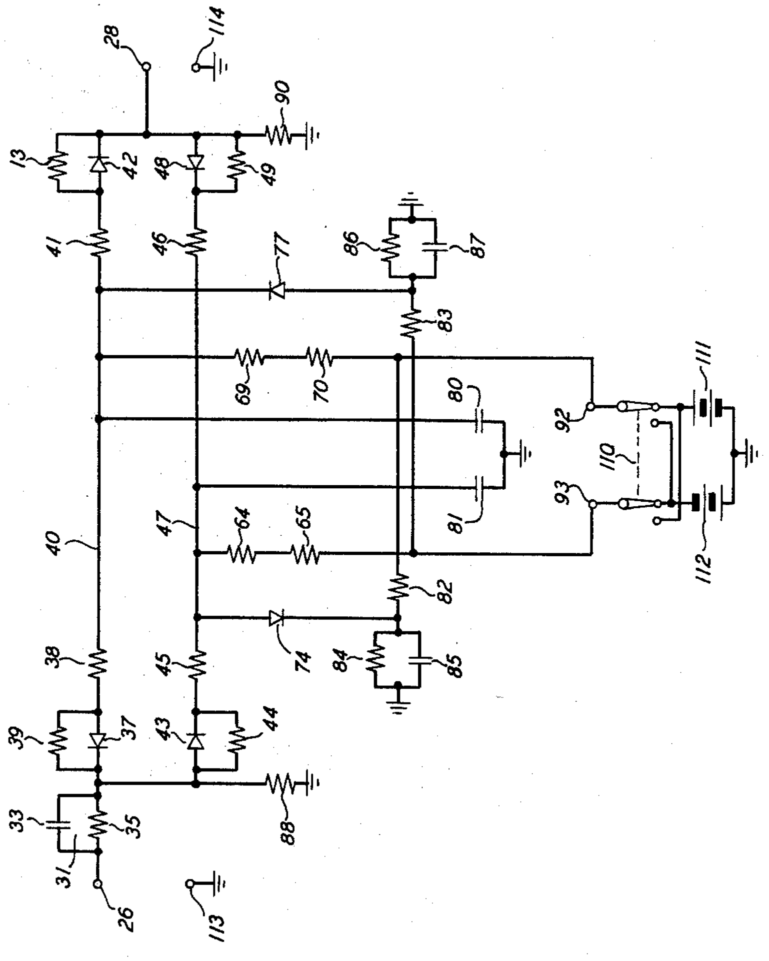
FIG. 4 is a schematic circuit diagram of another embodiment of the gate of the present invention arranged for use with single ended signals.

In another embodiment as shown in FIG. 4, the gate of the present invention is adapted for use with a single-ended signal. Like characters in FIGS. 1 and 4 denote the same elements and these elements of FIG. 4 perform the same functions and operate in the same manner as they do in the operation described in conjunction with FIG. 1. It is to be noted that FIG. 4 only shows one-half of the gate depicted in FIG. 1, the lower half of the gate depicted in FIG. 1 being replaced by connections to ground. Likewise, terminals 27 and 29 of FIG. 1 have been replaced by terminals 113, 114, respectively, in FIG. 4 and these terminals are grounded. Wherever a virtual ground has appeared in FIG. 1 an actual ground will appear at that same point in FIG. 4.

It will be obvious that the alternating-current equivalent circuits of the gate depicted in FIG. 4 will be the same as one-half of the alternating-current equivalent circuits set forth in conjunction with FIG. 1. That is, in the On state the alternating-current equivalent circuit of FIG. 4 will comprise the resistors 96, 97 and 100 in the same configuration as shown in FIG. 2A. Furthermore, these equivalent resistors (96, 97, 100) will be comprised of the same elements as set forth in conjunction with FIG. 1. Likewise, the alternating-current circuit for the gate in the Off state will be resistors 88, 104, 108, 105 and 90 in the same configuration as shown in FIG. 3A. The direct-current equivalent circuits for the gate shown in FIG. 4 will be the same as those circuits illustrated in FIGS. 2B and 3B, respectively.

In this embodiment of the gate it is apparent that if there is any unbalance in the control voltages there will not be any cancellation of the unbalanced current in the output as there was in the circuit of FIG. 1. Thus it is necessary to insure that the control bias source be a source of symmetrical voltage for all conditions of operation.

What is claimed is:

1. An electronic gate comprising a pair of input terminals and a pair of output terminals, two first arms, means connecting one of said first arms between an input and an output terminal and connecting the other first arm between the other input and output terminal, each of said first arms comprising an upper and lower path, each path having at least two oppositely poled asymmetrical conducting devices therein, a plurality of second arms individually associated with each path and connecting each of said upper and lower paths of one of the first arms to the corresponding path of the other of said first arms, at least two of said plurality of second arms having a plurality of asymmetrical conducting devices connected therein, and biasing means connected to another of said plurality of the second arms and capable of placing a negative or positive potential on these arms, said paths constituting two balanced bridges connected in parallel with respect to said biasing means to prevent the biasing voltage from appearing at the output terminals, said gate presenting a low impedance to signal energy introduced at the input terminals when the biasing means places a positive potential on one second arm and a negative potential on the other second arm, said gate presenting a high impedance to signal energy when the polarities on said second arms are reversed.

2. An electronic gate for connection to a cable having a predetermined characteristic impedance, comprising a pair of input terminals, two series arms connecting said input pair of terminals to an output pair of terminals, each of said series arms having an upper and a lower path, each of said paths having at least two oppositely poled asymmetrical conducting devices connected therein, a series impedance means and a parallel impedance means connected to each of said plurality of asymmetrical conducting devices in each of the said paths, three shunt arms connecting the lower paths of each of the series arms and three shunt arms connecting the upper paths of each of the series arms, each set of three shunt arms being identical to the corresponding set of three shunt arms, one arm of one set of shunt arms having at least two oppositely poled asymmetrical conducting devices connected therein, and biasing means connected to another arm of said set of shunt arms and capable of placing a negative or positive voltage on this arm, said series impedance means forming a balanced bridge to said biasing means for one polarity of bias, said parallel impedance means forming a balanced bridge with respect to said biasing means to prevent any voltage appearing at the output terminals for the other polarity of bias.

3. An electronic gate for connection to a cable comprising a pair of input terminals, a pair of output terminals and two series arms connecting the input and output terminals, each of said series arms comprising an upper and lower path, each upper path containing two asymmetrical conducting means with their cathodes connected together, each lower path containing two asymmetrical conducting means with their anodes connected together, a series impedance means in series with each asymmertical conducting means and an impedance means in parallel with each asymmetrical conducting means, at least three shunt arms connecting each lower path and at least three shunt arms connecting each upper path, each set of three shunt arms being identical, at least one arm of each set of said shunt arms containing two asymmetrical conducting means, one of said shunt arms having the anodes of said asymmetrical conducting means connected together, the other of said shunt arms having the cathodes of the asymmetrical conducting means connected together, and biasing means connected to another of said shunt arms and capable of placing a negative or positive potential on these arms, said series impedance means forming a balanced bridge with respect to said biasing means for one polarity of bias voltage, said parallel impedance means forming a balanced bridge with respect to said biasing means for the other polarity of biasing voltage.

4. An electronic gate in accordance with claim 2 wherein said shunt arms are connected between said series impedance means of the upper and lower paths of the series arms respectively, two of the shunt arms connecting the lower paths having impedance means connected therein.

5. A device as defined in claim 4 wherein said impedance means in one of said shunt arms connecting the lower paths comprise resistors, the impedance means in the other arm comprising a capacitor to form a low-pass filter with the inductance introduced by the circuit connections.

6. In combination with a device as defined in claim 3, a compensating network connected between the input terminals and each of said series arms to compensate for the reactance produced by said asymmetrical conducting devices.

7. A device as defined in claim 6 wherein said compensating networks comprise a resistor in parallel with a capacitor, and impedance means connected between said compensating networks and ground and said output terminals and ground.

8. An electronic gate for connection to a cable having a predetermined characteristic impedance comprising a pair of input terminals, two series arms connecting said input pair of terminals to an output pair of terminals, each of said series arms having an upper and a lower path, each of said paths having at least two oppositely poled asymmetrical conducting devices connected therein, a series impedance means and a parallel impedance means connected to each of said asymmetrical conducting devices in each of said paths, three shunt arms connecting the lower paths of each of the series arms and three shunt arms connecting the upper paths of each of the series arms, each set of three shunt arms being identical to the corresponding set of three shunt arms, at least one of said shunt arms in each set having at least two oppositely poled asymmetrical conducting devices connected therein, and biasing means connected to another of said shunt arms in each set and capable of placing a negative or positive voltage on this arm, said series impedance means forming a balanced bridge to said biasing means for one polarity of bias, said parallel impedance means forming a balanced bridge with respect to the said biasing means to prevent any voltage appearing at the output terminals for the other polarity of bias, and a biasing network connected between the asymetrical conducting devices of the shunt arms.

9. A gate in accordance with claim 8 wherein said biasing network comprises a resistor connected between said biasing voltage and the shunt arm containing the asymmetrical conducting devices and a parallel combination of a resistor and condenser connected between this shunt arm and ground.

10. An electronic gate comprising a cable having a predetermined characteristic impedance connected to a pair of input terminals, a pair of output terminals and two series arms connecting said input and output terminals, said series arms comprising an upper and lower path, said upper paths containing two asymmetrical conducting means, impedance means in series with said asymmetrical conducting means and impedance means in parallel with said asymmetrical conducting means in said upper paths, the asymmetrical conducting means having their cathodes connected together, the lower paths of said series arms comprising two asymmetrical conducting means, impedance means in series with said asymmetrical conducting means and impedance means in parallel with said asymmetrical conducting means in said lower paths, said asymmetrical conducting means in said lower paths having their anodes connected together, three shunt arms connecting said lower paths and identical to three shunt arms connecting said upper paths, one of said shunt arms of each set having two asymmetrical conducting means connected in opposition to one another, biaisng means connected to another one of said shunt arms of each set to place a positive or negative potential on the shunt arm, the shunt arm connected to the biasing means having a resistance means connected therein, the series impedance means presenting a balanced bridge with respect to the biasing means for one polarity of bias, a compensating network connected between said input and said series arms comprising a resistor in parallel with a capacitor to compensate for the inductance introduced by the asymmetrical conducting devices and make the gate appear resistive to signals throughout the band of frequencies transmitted, a biasing network connected to the shunt arms containing the asymmetrical devices to place a back bias on said asymmetrical conducting devices, said biasing network comprising a resistor connected between said biasing voltage and said shunt arm and the parallel combination of a resistor and capacitor connected between said shunt arm and ground.

11. An electronic gate comprising a pair of input terminals and a pair of output terminals, two bridge networks each having a first, second, third and fourth vertex, means for respectively connecting the first and second vertices of one bridge network to one input terminal and one output terminal, means for respectively connecting the first and second vertices of the other bridge network to the other input terminal and the other output terminal, a first impedance connecting the third vertices of each bridge network together, a second impedance connecting the fourth vertices of each bridge network together, means for applying a bias of reversible polarity to the bridge networks, means activated by said bias for shunting both of said first and second impedances with a relatively small impedance with respect to the first and second impedances for one polarity of said bias and with a relatively large impedance with respect to the first and second impedances for the other polarity of said bias.

12. A device as defined in claim 11 wherein each of the arms of each bridge network are identical and comprise third impedances, means for shunting a portion of each of said third impedances with a relatively large impedance with respect to said shunted portion for said one polarity of said bias and with a relatively small impedance with respect to said shunted portion for said other polarity of said bias.

13. An electronic gate comprising a pair of input terminals and a pair of output terminals, two bridge networks each having a first, second, third and fourth vertex, means for respectively connecting the first and second vertices of one bridge network to one input terminal and one output terminal, means for respectively connecting the first and second vertices of the other bridge network to the other input terminal and the other output terminal, an impedance connecting the third vertices of each bridge network together and another impedance connecting the fourth vertices of each bridge network together, two oppositely poled asymmetrical conducting means connected in series shunting each of said impedances, and biasing means connected to the impedances for biasing said asymmetrical conducting means into and out of their high impedance state.

14. An electronic gate as defined in claim 13 wherein each of the arms of the bridge networks comprises asymmetrical conducting means in series with a first impedance and in parallel with a second impedance and are adapted to be switched into and out of their high impedance by said biasing means.

References Cited in the file of this patent

UNITED STATES PATENTS

| | | |
|---|---|---|
| 2,728,042 | Ruhland | Dec. 20, 1955 |
| 2,782,307 | von Sivers et al. | Feb. 19, 1957 |
| 2,810,885 | Davis et al. | Oct. 22, 1957 |
| 2,866,103 | Blake et al. | Dec. 23, 1958 |